United States Patent [19]

Treviranus

[11] 4,068,222
[45] Jan. 10, 1978

[54] CIRCUIT ARRANGEMENT FOR AUTOMATIC LEVEL CONTROL FOR OPTICAL SENSORS WITH PULSED RADIATION, FOR EXAMPLE FOR SURVEILLANCE EQUIPMENT

[75] Inventor: Ulrich Treviranus, Bremen, Germany

[73] Assignee: U.S. Philips Corporation, New York, N.Y.

[21] Appl. No.: 628,596

[22] Filed: Nov. 4, 1975

[30] Foreign Application Priority Data

Nov. 7, 1974 Germany .............................. 2452794

[51] Int. Cl.² .......................................... G08B 13/18
[52] U.S. Cl. ............................... 340/258 R; 250/221; 340/258 B; 356/5
[58] Field of Search ............... 340/258 R, 258 B, 259, 340/276, 228 S, 258 D; 250/221; 343/5 PD; 356/5, 51

[56] References Cited

U.S. PATENT DOCUMENTS

| 3,383,678 | 5/1968 | Palmer | 343/5 |
|---|---|---|---|
| 3,549,892 | 12/1970 | Perlman | 250/214 |
| 3,597,755 | 8/1971 | Parkin | 340/258 |
| 3,680,047 | 7/1972 | Perlman | 340/258 B |
| 3,727,207 | 4/1973 | Missio et al. | 340/258 B |
| 3,816,745 | 6/1974 | Primm et al. | 250/221 |
| 3,832,056 | 8/1974 | Shipp et al. | 356/5 |
| 3,859,647 | 1/1975 | Ross | 340/258 B |

Primary Examiner—John W. Caldwell
Assistant Examiner—Joseph E. Nowicki
Attorney, Agent, or Firm—Frank R. Trifari

[57] ABSTRACT

Alarm signals are produced in response to variations in the radiation conditions between a pulsed IR-transmitter and a IR receiver whose output amplitude is adjustable and which is synchronously chopped by the emitted pulses, and the adjustable output signal voltage of the receiver is compared with a reference signal voltage derived from the transmitter in a comparator which is chopped synchronously with the pulse frequency of the transmitter. The comparator is followed by a control voltage generator with an integrator stage for a control element, which controls the output amplitude of the receiver, and a decision unit, to which an alarm means and a control indicator are connected.

3 Claims, 3 Drawing Figures

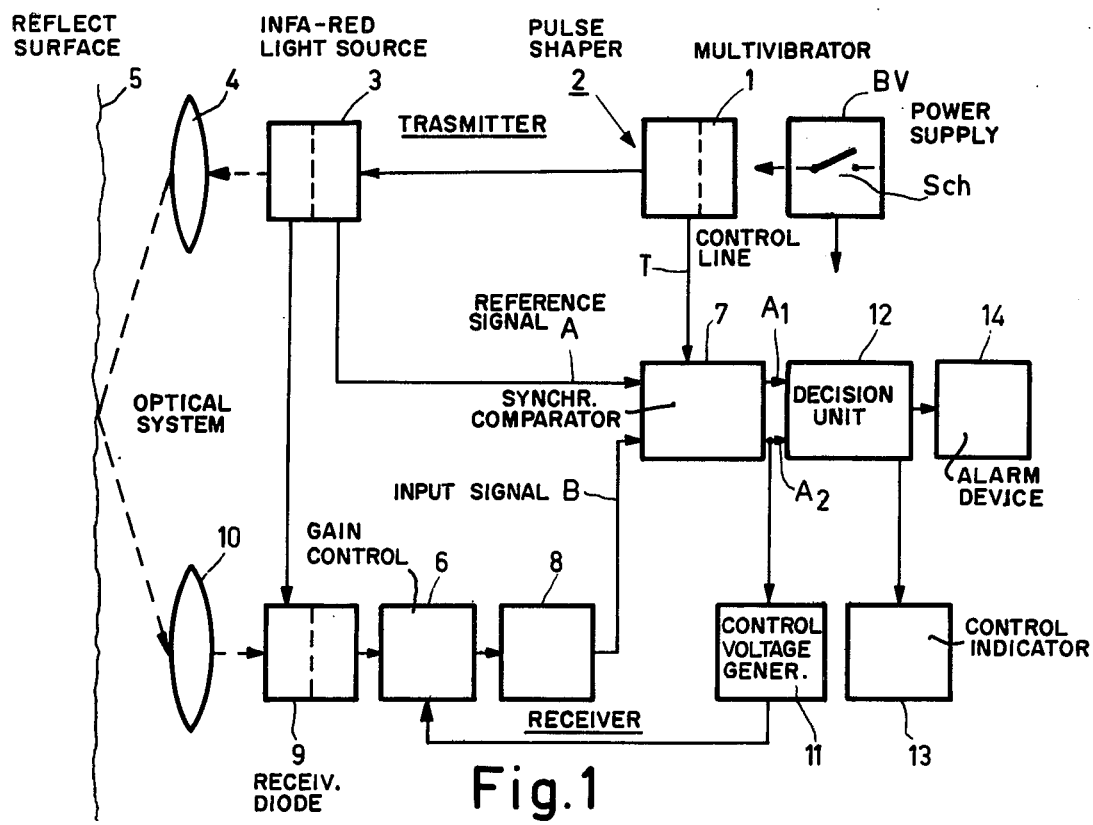
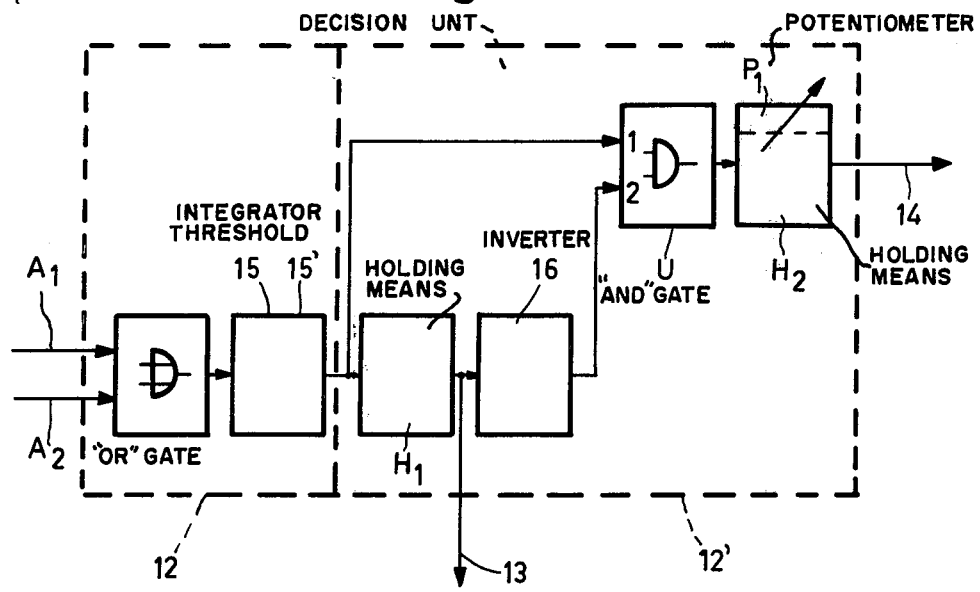
Fig.1
Fig.2

CIRCUIT ARRANGEMENT FOR AUTOMATIC LEVEL CONTROL FOR OPTICAL SENSORS WITH PULSED RADIATION, FOR EXAMPLE FOR SURVEILLANCE EQUIPMENT

The invention relates to a circuit arrangement for automatic level control for optical sensors with pulsed radiation, for example for surveillance equipment, alarm signals being produced in response to changes in the radiation conditions between a pulsed IR-transmitter and an IR receiver whose output amplitude is adjustable and which is synchronously chopped by the emitted pulses, and the adjustable output signal voltage of the receiver being compared with a reference signal voltage derived from the transmitter in a comparator which is chopped synchronously with the pulse frequency of the transmitter.

Circuit arrangements of this type for manually controlling the level of the receiver output signal have already been proposed for surveillance equipment. The advantages of such devices equipped therewith, which devices are generally battery-powered, are the wide range of application and the high reliability of operation, in particular owing to the avoidance of erroneous alarms after the adustment of the device.

It is an object of the invention to improve the operation of pre-setting or adjusting such devices to readiness for operation and to automate the operation of rendering such devices responsive so that the manual pre-adjustment operations necessary until now may be dispensed with.

This is achieved in that the comparator is followed by a control voltage generator with an integration stage for a control element which controls the output amplitude of the receiver and a decision unit, to which an alarm means and a control indicator are connected.

The pre-adjustment during setting up which always requires, some time and skill may be dispensed with, because approximately 20 seconds after switching on the device is directly ready for operation. Furthermore, the long-term stability is improved, because slow variations in equipment and ambient conditions can no longer have any effect.

The invention will be described in more detail with reference to an embodiment shown in the accompanying drawing. In the drawing:

FIG. 1 shows a block diagram,

FIG. 2 shows the block diagram of the decision unit, and

Figure 3:
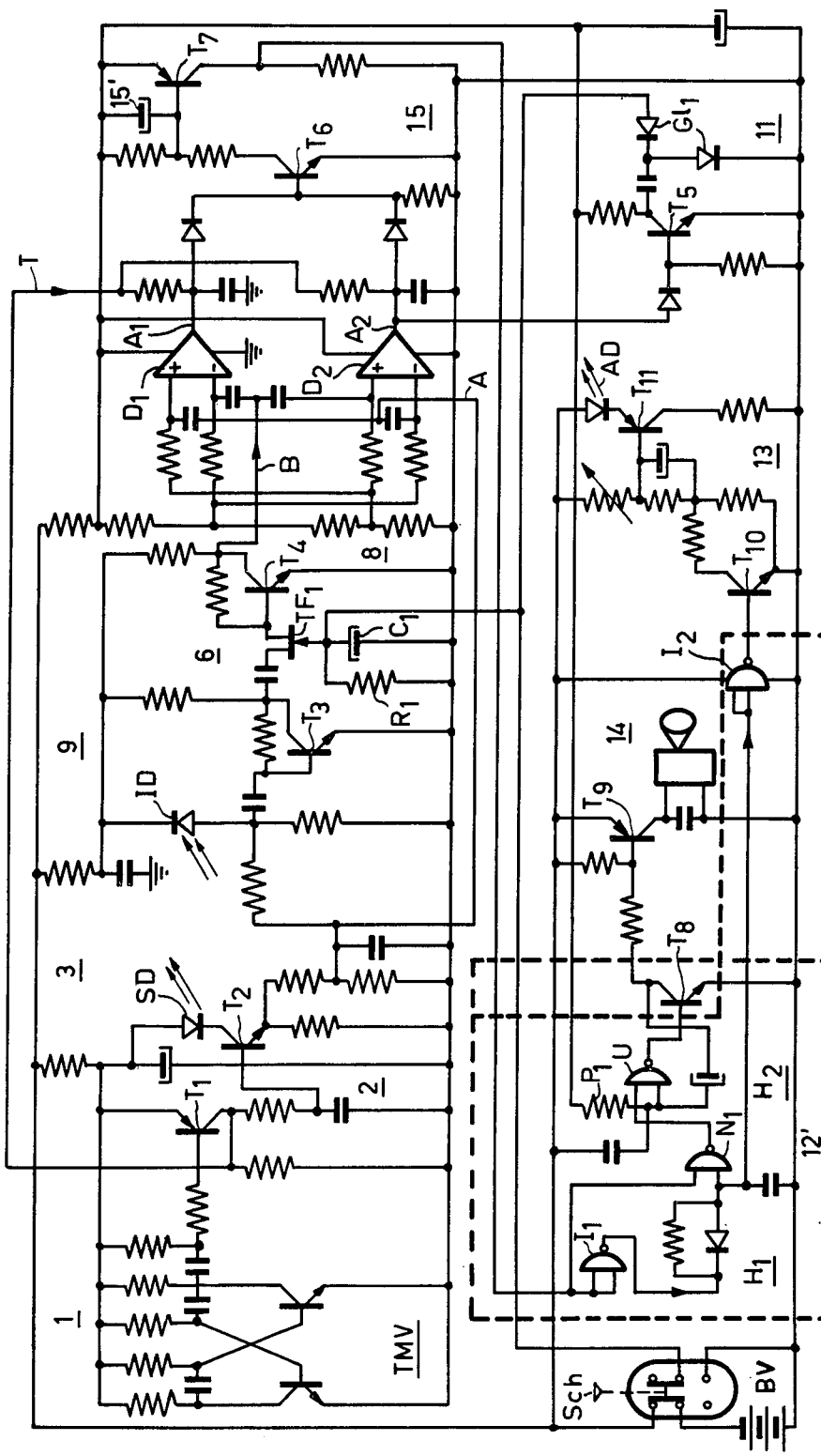
FIG. 3 shows a complete circuit arrangement in more detail.

In FIG. 1 the transmitter section consists of a multivibrator stage 1, a pulse-shaper stage 2 and an IR light source 3, for example a light-emitting or laser diode. With the aid of an optical system 4 a beam with a defined angle of aperture is aimed at the reflecting object 5. The operating voltage BV of the apparatus is supplied by monocells and can be switched on with a switch Sch.

At the same time a reference signal voltage A is derived from the IR light source 3, which voltage is applied to a synchronously chopped comparator 7, whose other input is connected to an amplifier 8 in the receiver section for the voltages supplied by a receiving diode 9 which is preceded by an optical system 10.

In the multivibrator 1 short pulses are produced, which are converted into infra-red light pulses. A signal which is directly derived from the transmitter is added to the signal picked up by the receiving diode 9. This assures that the device can also be adjusted when no reflected radiation is received, for example when openings in comparatively long walls etc. are being watched, the surveillance device being installed along said walls.

With the aid of a control element 6, which is for example constituted by a field-effect transistor, the gain is adjusted so that the amplified signal B equals the reference signal A which is taken directly from the transmitter.

The comparator 7 is controlled via the line T, and is switched on only during the emitted pulse. During this time pulses appear at its output $A_1$ and at the output $A_2$, when the input signal (B) is a specific amount (approx. 5 mV) smaller or greater than the reference signal A. When the device is switched on the amplifier 8 provides the full gain. Its output signal B is consequently greater than the reference signal A. At the output $A_2$ of the comparator 7 pulses appear which have the same duration and phase as the emitted pulses. By means of these pulses a control voltage generator 11 is controlled which supplies a control voltage in that a capacitor C1 is charged with the aid of a rectifier circuit G11 (FIG. 3)..

The control voltage influences the control element 6 and reduces the gain. The control process is terminated when the output signal B of the amplifier 8 has decreased to the value of the reference signal A. Then only smaller pulses appear at the output $A_2$ of the comparator 7. Signal and reference pulses do not overlap each other completely. These smaller pulses supply a charge to the capacitor C1 of the control voltage generator which equals the charge drained via a discharge resistor R1. The system is balanced.

Immediately after the device is switched on the decision unit (FIG. 2) supplies a logic "1" at the output of a holding means $H_1$; the control indicator 13 lights up; the "and" gate U is blocked; no alarm signal can be supplied.

The pulses at the output $A_2$ of the comparator 7 are integrated in the integrator 15, 15'; the output signal of the integrator exceeds the threshold value; the output of the holding means $H_1$ remains at "1". After the termination of the control process the output $A_1$ of the comparator 7 only supplies small pulses. The output signal of the comparator then no longer exceeds the threshold value. After the holding time of the holding means H1 (approx. 2 to 3 seconds) the control indicator 13 extinguishes and the "and" gate U, which is controlled via an inverter 16, is released; the device is now responsive.

A waiting time of 2 to 3 seconds is necessary, because the control process is not suddenly terminated the system requires some time to stabilize.

When in the adjusted condition the pulses at the comparator input slowly change in magnitude, either owing to remission variations in the "field of view" or owing to variations in the device (aging, temperature drift etc.), the pulses at the output $A_2$ of the comparator 7 become smaller when the signal becomes smaller, or greater when the signal becomes greater. As a result, the control voltage decreases or increases so that the balanced condition can be restored. During this process the threshold 15' at the output of the integrator 15 is not exceeded. No alarm signal is given.

When the signal varies so strongly that the variation cannot be eliminated during some periods of the emitted pulses, the alarm is rendered operative. In this case large pulses appear at the output $A_1$ or $A_2$ of the comparator 7, as a result of which the threshold value at the output of the integrator stage 15 is exceeded. As the holding means H1 responds with a slight delay, the "and" gate U remains briefly open, so that the alarm means 14, for example a penetrating hooter etc., is activated.

The duration of the alarm can be adjusted by changing the time constant of a holding means H2 by means of a pre-set potentiometer $P_1$ (FIG. 3).

After the termination of the alarm the device is reset and is then again ready for use or operation respectively. Blocking and unblocking of the alarm means can also be effected in such a way that after termination of the first alarm immediately a new alarm is given, for example owing to a change in position of the surveillance device, without awaiting pre-adjustment.

After the equipment has been switched on via swich Sch a transistor multivibrator TMV in the circuit arrangement of FIG. 3 supplies very short pulses via transistor stages T1 and T2, by which a IR emitting diode SD is driven, so that a beam of very short powerful pulses of invisible IR light is produced in a rhythm of for example 100 Hz. At the same time clock pulses for two differential amplifiers D1 and D2 of the comparator are taken from the transistor stage T1 via line T. With the aid of the transistor stage T2 a signal derived from the transmitter is added to the diode signal supplies by the IR receiving diode ID and the reference signal A is supplied. The receiving amplifier comprises the transistor stage T3, the field-effect transistor TF1 and the transistor stage T4. The field-effect transistor TF1 is driven by the control voltage generator 11 at its input electrode, to which the integrating network C1, R1 is also connected. Said generator derives its input voltage from the output $A_2$ of the differential amplifier D2 and comprises a transistor stage T5 followed by a rectifier G11.

The integrator stage 15 with the threshold 15' which stage comprises the transistors T6 and T7, is connected to the interconnected outputs A1, A2 of the differential amplifiers D1 and D2, said stage being followed by the actual decision unit 12' which comprises four gates 11, 12, U, N1 with the holding means H1 and H2. Via the transistor stages T8 and T9 the alarm means 14 is connected to the "and" gate U with the holding means H2, whilst the control indicator diode AD is connected to the holding means H1 via the inverter I2 and the transistor stages T10 and T11.

What is claimed is:

1. A circuit arrangement for automatic output level control for optical sensors, comprising a pulsed IR-transmitter, an IR receiver, optical means for defining the angle of transmission of the pulsed infra-red radiation and for directing reflected radiation to the receiver, means for providing automatic gain adjustment of said IR receiver in response to a control voltage, means for comparing a receiver output signal with a reference signal derived from the transmitter in synchronism with the transmitted pulses, means for generating said control voltage proportional to an output signal from said comparing means and for applying the control voltage to said receiver gain adjusting means, a decision unit including means for producing an integrated value from the output signal from said comparing means and for comparing the integrated value to a predetermined threshold value, and means for producing an alarm signal, after a predetermined waiting period when the integrated value exceeds said threshold value.

2. A circuit arrangement as claimed in claim 1, wherein the control voltage generating means comprises a transistor stage connected to a rectifier and an integrator, which is connected to a control input of the gain adjusting means.

3. A circuit arrangement as claimed in claim 1, wherein the decision unit comprises an input "or" gate, an integrator having an input connected to an output of the "or" gate, first holding means connected to an output of the integrator, an inverter connected to an output of the first holding means, an "and" gate having a first input connected to an output of said inverter and a second input connected to the output of said integrator, and second holding means connected to an output of said "and" gate.

* * * * *